United States Patent
Kappler

(10) Patent No.: US 7,177,992 B2
(45) Date of Patent: Feb. 13, 2007

(54) SYSTEM FOR COUPLING DATA STORED IN BUFFER MEMORIES TO BACKUP STORAGE DEVICES

(75) Inventor: Bernhard Kappler, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 10/697,948

(22) Filed: Oct. 31, 2003

(65) Prior Publication Data

US 2005/0055520 A1    Mar. 10, 2005

(30) Foreign Application Priority Data

Sep. 8, 2003   (DE) ................... 103 41 692

(51) Int. Cl.
*G06F 12/00* (2006.01)

(52) U.S. Cl. .................................... 711/162

(58) Field of Classification Search .............. None
See application file for complete search history.

(56) References Cited

U.S. PATENT DOCUMENTS

| 5,276,860 | A  |   | 1/1994  | Fortier et al. |
|-----------|----|---|---------|----------------|
| 5,673,381 | A  | * | 9/1997  | Huai et al. ................. 714/1 |
| 5,758,067 | A  |   | 5/1998  | Makinen et al. |
| 6,212,512 | B1 |   | 4/2001  | Barney et al. |
| 6,330,570 | B1 |   | 12/2001 | Crighton |
| 6,421,687 | B1 | * | 7/2002  | Klostermann ............ 707/202 |
| 6,505,216 | B1 | * | 1/2003  | Schutzman et al. ...... 707/204 |
| 6,889,228 | B1 | * | 5/2005  | Federwisch .............. 707/102 |
| 6,959,368 | B1 | * | 10/2005 | St. Pierre et al. ......... 711/162 |

* cited by examiner

*Primary Examiner*—Mano Padmanabhan
*Assistant Examiner*—Duc T Doan

(57) ABSTRACT

A backup system and method enables a user to configure the backup, data mirroring and/or a data copying process on a fine granularity level by configuring buffer memories of backup media agents and/or restore media agents which are coupled in one or more daisy-chain configurations.

24 Claims, 8 Drawing Sheets

SYSTEM FOR COUPLING DATA STORED IN BUFFER MEMORIES TO BACKUP STORAGE DEVICES

RELATED APPLICATIONS

The present application is based on, and claims priority to German Application Number 103 41 692.7, filed Sep. 8, 2003, the disclosure of which is hereby incorporated by reference herein in its entirety.

FIELD OF THE INVENTION

This invention generally relates to computer systems and more particularly to backup systems and methods.

BACKGROUND AND PRIOR ART

Most computer users in the desktop environment employ some sort of data protection procedures and devices to protect computer system files and data files in the event of an accidental delete or overwrite of these files from the primary storage medium, which is usually the computer's hard drive. Computer data protection systems usually involve the backup of system and data files onto some sort of secondary storage device utilizing removable storage media, such as floppy disk drives, other hard disk drives, tape drives, etc. More sophisticated users may utilize automatic data protection devices and procedures that backup the entire system on a regular basis, allowing for a full system recovery if needed.

For example, tape backup systems are used to protect data files and other information from computer system failures such as hard disk crashes or computer virus attacks. A tape backup system stores this data on removable off-line media (i.e., the tape); this data can then be retrieved in the event of data loss. Conventional backup systems typically provide the end user with a choice of making a "full" backup or an "intermediate" or "modified" backup. Full backups make complete copies of all the data on the computer to a set of one or more backup tapes. Incremental backups are generally much smaller than full backups since they simply save the data that has been changed since either the last full backup or the most recent incremental backup. Example of such prior art backup systems are described in U.S. Pat. No. 5,276,860, U.S. Pat. No. 5,758,067, U.S. Pat. No. 6,212,512, and U.S. Pat. No. 6,330,570.

Further, a backup system for Enterprise Data Protection and Disaster Recovery is commercially available from Hewlett Packard, i.e. HP OpenView Storage Data Protector.

SUMMARY OF THE INVENTION

The present invention provides a backup system for storing of data objects on secondary storage devices. The backup system has a number of buffer memories which provide interfaces to the secondary storage devices. Preferably, the backup system is configurable to couple at least a sub-set of the buffer memories in one or more daisy-chains.

This way a user is enabled to control the copying or mirroring of data objects with a fine level of granularity. Instead of mirroring all backup data, the invention enables to mirror only a sub-set of the data objects of the backup data. This way mirroring can be limited to the most important data objects. Likewise, in the case of copying the invention enables to copy only a sub-set of the data objects which is configurable by the user. This way a high degree of flexibility is provided which can be used in order to improve tape management.

In particular the present invention can be advantageously used for tape compaction, tape refreshing, tape demultiplexing, restore chain optimization and data object migration.

In accordance with a further preferred embodiment of the invention at least one backup media agent is used for the purposes of backup, mirroring and/or copying. A backup media agent comprises a plurality of buffer memories and a program module for writing of data from the buffer memories to a secondary storage device being assigned to the backup media agent.

Usually there is a one-to-one relationship between backup media agents and secondary storage devices. Preferably each one of the buffer memories of the backup media agent is assigned to one data object. The program module of the backup media agent combines the data sequences of the individual data objects into a single data sequence for storage on the secondary storage device.

In accordance with a further preferred embodiment of the invention backup media agents are cascaded in order to provide one or more mirroring stages.

In accordance with a further preferred embodiment of the invention at least one restore media agent is used for reading of data from the secondary storage device. The restore media agent has a plurality of buffer memories and a program module for reading of data sequences of data objects stored on the secondary storage device. The program module splits the single data sequence received from the secondary storage device into separate data objects and stores the data objects in separate ones of the buffer memories from where the data objects are forwarded to other buffer memories of backup media agents.

In accordance with a further preferred embodiment of the invention a number of client computers is coupled to a backup server. The client computers have local backup agents for reading of data objects to be protected from a primary data source of the respective client and for assigning of an unequivocal identifier to each data object. The unequivocal identifier assigned to the data objects enables the backup media agent to combine a plurality of data object sequences into a single data sequence for sequential storage on the secondary storage device.

It is to be noted that instead of tape recorders any other suitable storage technology which provides removable storage media can be used.

BRIEF DESCRIPTION OF THE DRAWINGS

In the following preferred embodiments of the invention will be described, by way of example, and with reference to the drawings in which.

DETAILED DESCRIPTION

Figure 1A:
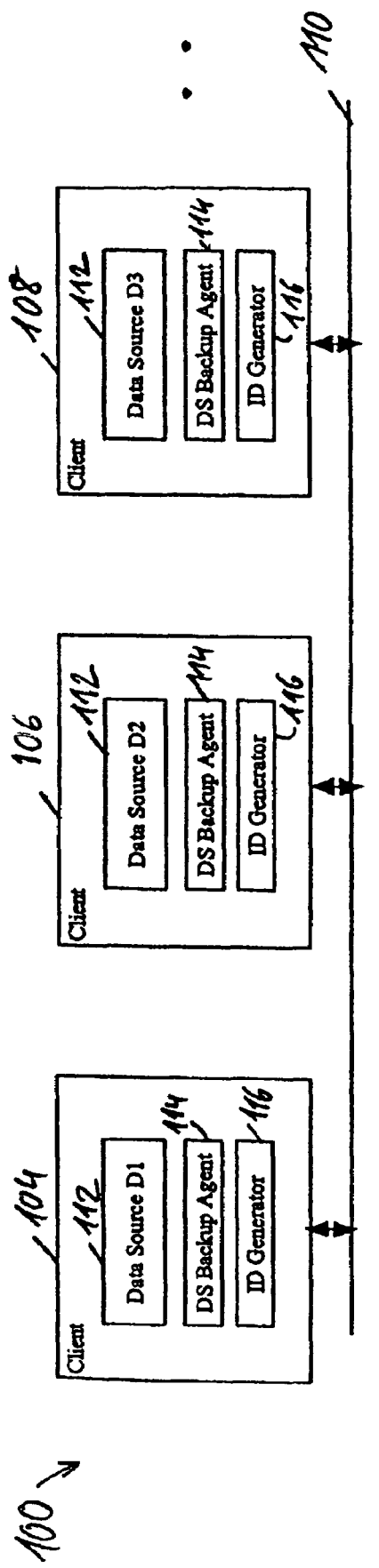
FIGS. 1A and 1B together is a block diagram of a client-server backup system.
Figure 2A:
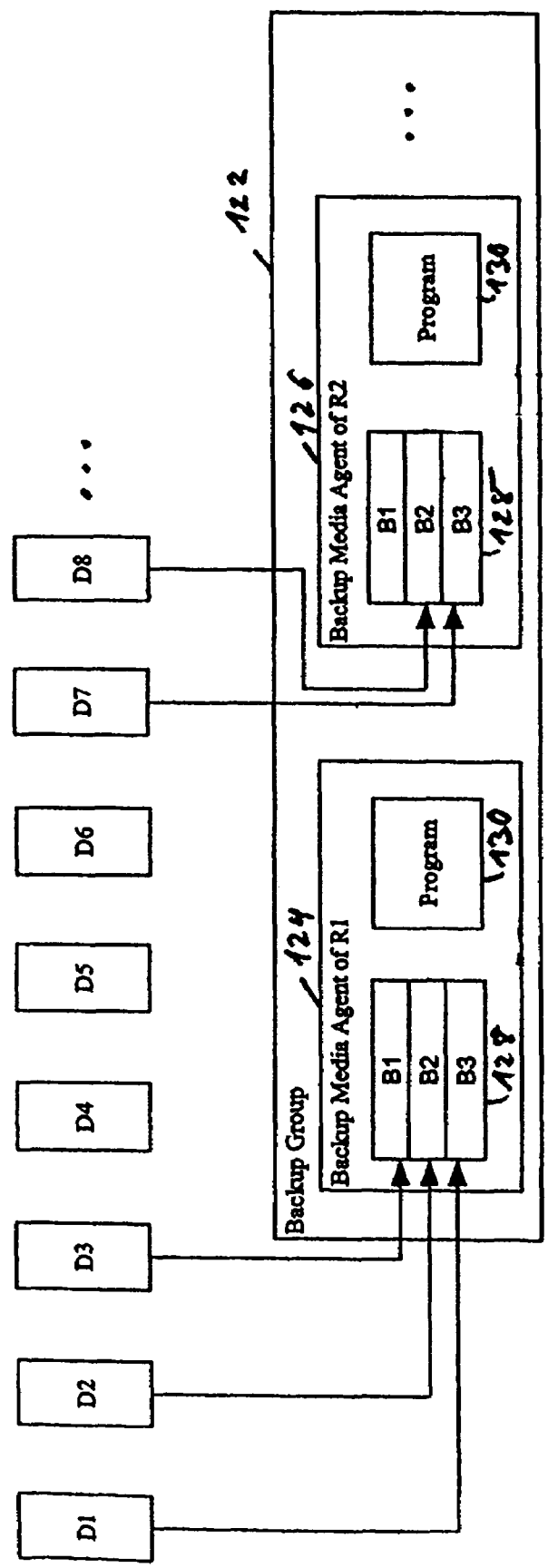
FIGS. 2A and 2B are illustrative of the assignment of data sources to backup media agents and of a daisy-chain configuration of the buffer memories of the backup media agents.

FIGS. 1A and 2A together form a block diagram of backup system 100. Backup system 100 has backup server 102 to which a plurality of client computers 104, 106, 108, . . . are connected by means of data bus 110. For example data bus 110 is an Ethernet.

Client computer 104 has primary storage device 112 for local storage of client data. Typically primary storage device 112 is a disk mass storage device. Various files and folders are typically stored on primary storage device 112. ID generator 116 generates an unequivocal identifier for the data sequence. Each data packet in the sequence is labelled with that unequivocal identifier in order to be able to identify a given data packet as belonging to a particular data sequence at a later point of time, such as for the purpose of performing a restore operation.

Each one of the files and folders stored on primary storage device 112 can be selected by a user for data protection, i.e. for backing up the selected file or folder at regular prescheduled or user initiated points of time. The user selected files or folders stored on primary storage device 112 provide a data source D1 during a backup procedure.

Further client computer 104 has data source backup agent 114 which reads the data to be backed up from primary storage device 112. Data source backup agent 114 creates a data sequence containing the data read from primary storage device 112. Data source backup agent 114 is realised as a program module of a tape backup software package. Client computers 106, 108, . . . have an equivalent design as client computer 104. Client computer 106 has data source D2; client computer 108 has data source D3, . . . .

Backup server 102 has program module 118 for providing a user interface. By means of the user interface a user is enabled to configure backup server 102 for the purposes of backup, mirroring and/or copying. The corresponding configuration data is stored in configuration file 120. In configuration file 120 the data sources D1, D2, D3, . . . to be backed up are specified. Further configuration file 120 enables to define one or more backup groups. In the example considered here one backup group 122 has been defined. Backup group 122 has a number of backup media agents 124, 126, . . . .

Backup media agent 124 has a number of buffer memories 128 and a program module 130. Program module 130 belongs to the tape backup software package which includes data source backup agents 114 installed on the client computers. Program module 130 is designed to interact with data source backup agent 114 in order to receive backup data from the respective client computer on which data source backup agent 114 is installed.

Buffer memories 128 of backup media agent 124 provide intermediate storage for the backup data received from one of the data source backup agents 114 for the purpose of buffering the respective backup data stream flowing from the respective client computer to backup server 102. Typically buffer memories 128 are random access memories or first-in first-out (FIFO) buffers. Backup media agent 124 is assigned to one of the tape recorders 132 being coupled to backup server 102. Each one of the buffer memories 128 of backup media agent 124 is assigned to one of the data sources D1, D2, D3, . . . to be backed up.

For example the backup data sequence provided by data source backup agent 114 of client computer 104 for data source D1 is buffered in one of the buffer memories 128. The individual data sequences delivered by the data source backup agents 114 which are buffered in buffer memories 128 are combined by program module 130 into a single data sequence which is sequentially stored by means of one of the tape recorders 132 which is assigned to backup media agent 124.

The further backup media agents 126, . . . of backup group 122 are of similar design as backup media agent 124. These backup media agents 126, . . . are assigned to other data sources and to other recorders than backup media agent 124.

Further a user can configure one or more mirror groups 134, 136, . . . for providing one or more data mirroring stages. In the example considered here two data mirroring stages, i.e. mirror group 1 and mirror group 2, have been configured. Mirror group 1 has backup media agents 138, 140, . . . . Backup media agents 138, 140, . . . are of similar design as backup media agents 124, 126, . . . of backup group 122. Backup media agents 138, 140, . . . of mirror group 1 are coupled to backup media agents 124, 126, . . . of backup group 122 for "mirroring" of the backup data which is written on tape by backup media agents 124, 126, . . . of backup group 122. "Mirroring" means that an additional copy of the backed up data is created by writing the data to another tape by means of another tape recorder for improved data security. By means of mirroring a user can obtain multiple copies of the backup data on different tapes which can be stored at different locations.

Backup media agents 138, 140, . . . are configured differently, for the purpose of data mirroring. Buffer memories of backup media agents 138, 140, . . . are assigned to buffer memories of backup media agents 124, 126, . . . . Each one of backup media agents 138, 140, . . . of mirror group 1 is assigned to one of the recorders 132 which are coupled to backup server 102 for sequential writing of mirrored backup data.

Mirror group 2 is of a similar structure as mirror group 1. The buffer memories of the backup media agents of mirror group 2 are assigned to buffer memories of backup media agents of mirror group 1 in order to provide a second data mirroring stage.

Further backup server 102 has control program 142 which controls the backup and/or mirroring and/or copying process as specified in configuration file 120.

It is to be noted that the various backup media agents as well as user interface 118 can be implemented in a distributed way on multiple servers.

Figure 1B:
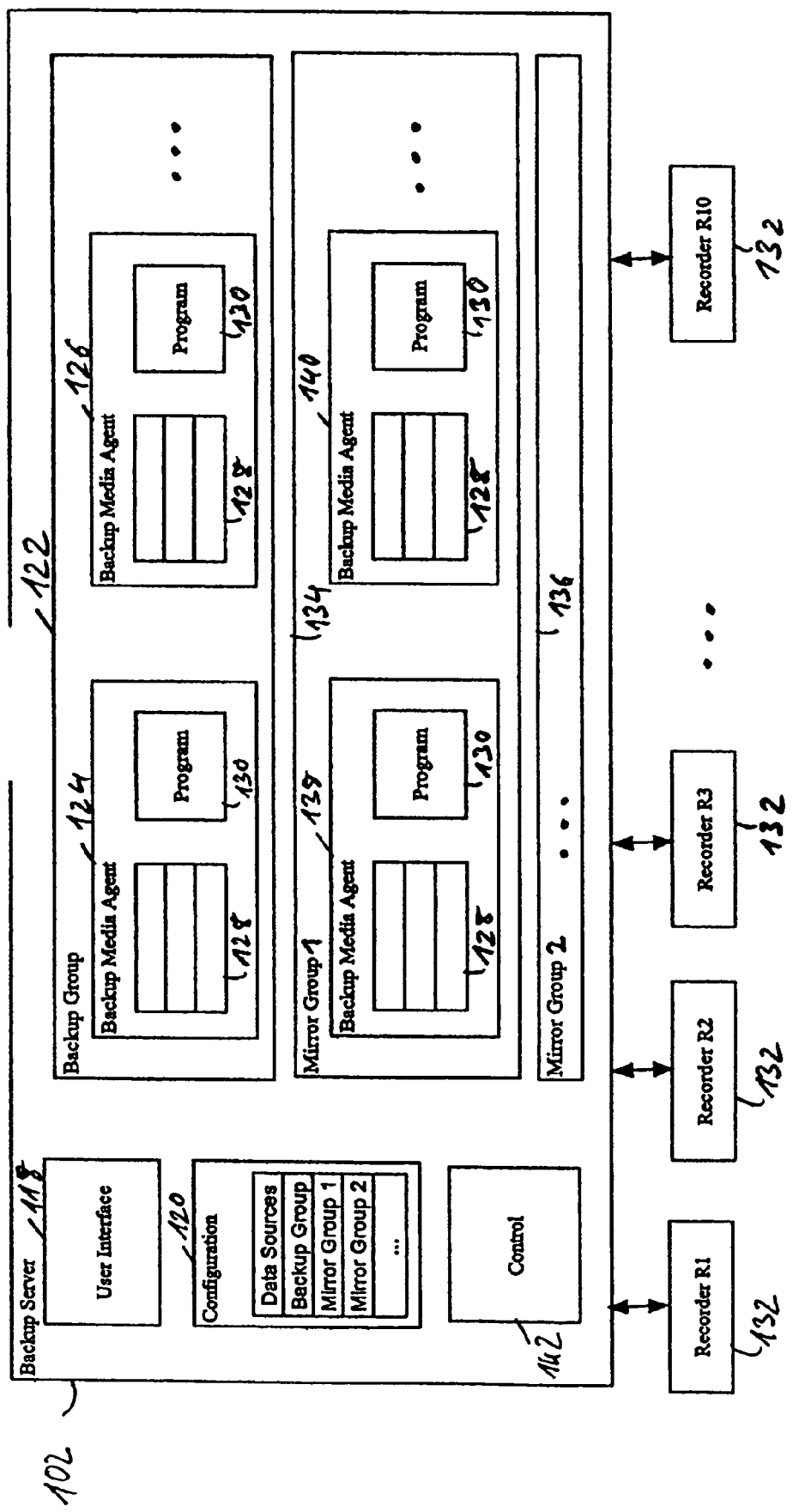
Figure 2B:
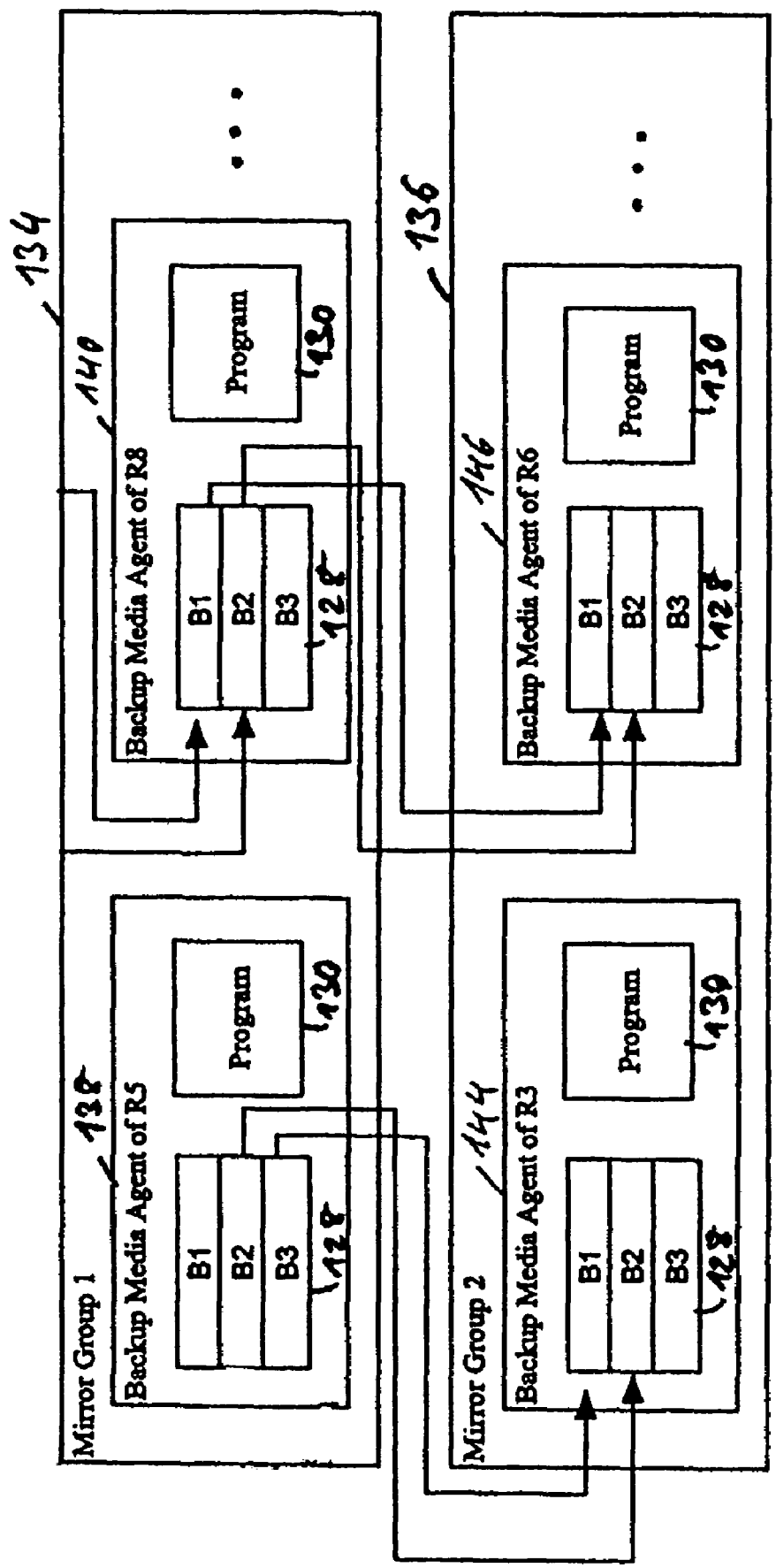

FIGS. 2A and 2B are illustrative of a user defined configuration of backup server 102 of FIG. 1. In the example considered here backup media agent 124 of backup group 122 is coupled to tape recorder R1; backup media agent 126 is coupled to tape recorder R2; backup media agent 138 of mirror group 1 is coupled to tape recorder R5; backup media agent 140 of mirror group 1 is coupled to tape recorder R8; backup media agent 144 of mirror group 2 is coupled to tape recorder R3 and backup media agent 146 of mirror group 2 is coupled to tape recorder R6. Preferably the assignment of the backup media agents to tape recorders is also stored in configuration file 120 (cf. FIG. 1).

Buffer memory B1 of backup media agent 124 is assigned to data source D3; buffer memory B2 of backup media agent 124 is assigned to data source D2, etc. In other words, at least a sub-set of the buffer memories of backup media agents 124, 126, . . . of backup group 122 is assigned to at least a sub-set of the data sources D1, D2, D3, . . . . Preferably the assignment of data sources to backup media agents and/or to individual buffer memories of the backup media agents of backup group 122 is stored in configuration file 120.

As far as mirror group 1 is concerned buffer memory B2 of backup media agent 138 is coupled to buffer memory B2 of backup media agent 124; buffer memory B3 of backup media agent 138 is coupled to buffer memory B3 of backup media agent 124, etc. In other words at least a sub-set of the buffer memories of backup media agents 138, 140, . . . of mirror group 1 is coupled to at least a sub-set of the buffer memories of backup media agents 124, 126, . . . of backup group 122. Likewise a sub-set of the buffer memories of backup media agents 144, 146, . . . of mirror group 2 is coupled to a sub-set of the buffer memories of backup media agents 138, 140, . . . of mirror group 1.

Again the assignment of buffer memories of mirror group to buffer memories of the backup group 122 is user configurable and can be stored in configuration file 120 as well as the assignment of buffer memories of mirror group 2 to buffers of mirror group 1.

In operation the backup media agents 124, 126, . . . of backup group 122 receive backup data sequences from the respective data sources D1, D2, . . . . The data sequences are buffered and combined into single data sequences by programs 130 for sequential storage on the respective tape recorders. Further the data sequences received from the individual data sources are forwarded through the respective buffers to the corresponding buffers of mirror group 1. Here the individual data sequences are also combined into single data sequences for sequential storage on the respective tape recorders. The same applies analogously to mirror group 2.

The cascaded connection of buffers of one or more mirror groups to the backup group 122 results in a daisy-chain configuration of the buffer memories. For example a daisy-chain is created which comprises buffer memory B2 of backup media agent 124, buffer memory B2 of backup media agent 138 and buffer memory B2 of backup media agent 144 as apparent from FIG. 2. Another example for a cascaded connection of buffers creating a daisy-chain is buffer memory B3 of backup media agent 126 coupled to buffer memory B1 of backup media agent 140 which in turn is coupled to buffer memory B1 of backup media agent 146.

By configuring the daisy-chains the user can control the copying or mirroring of data objects with a fine level of granularity. This is due to the fact that the selection of backup media agents of the backup group and one or more of the mirroring groups implies the user's selection for creating one or more additional backup copies for the data objects which are backed-up by the back up media agents of the backup group. Usually each one of the data sources D1, D2, . . . provides data for creating backup copies of data objects of the respective data source. Usually data objects which are backed-up are individual files, folders or a directory or sub-directory containing multiple files and/or folders.

It is to be noted that in case backup media agents run on the same server a buffer memory can be shared between two backup media agents in order to prevent unnecessary copying. For example, backup media agents 126 and 140 can use a single buffer memory 128 with three buffers B1, B2 and B3 instead of six buffers as shown in the example of FIGS. 2A and 2B.

Figure 3:
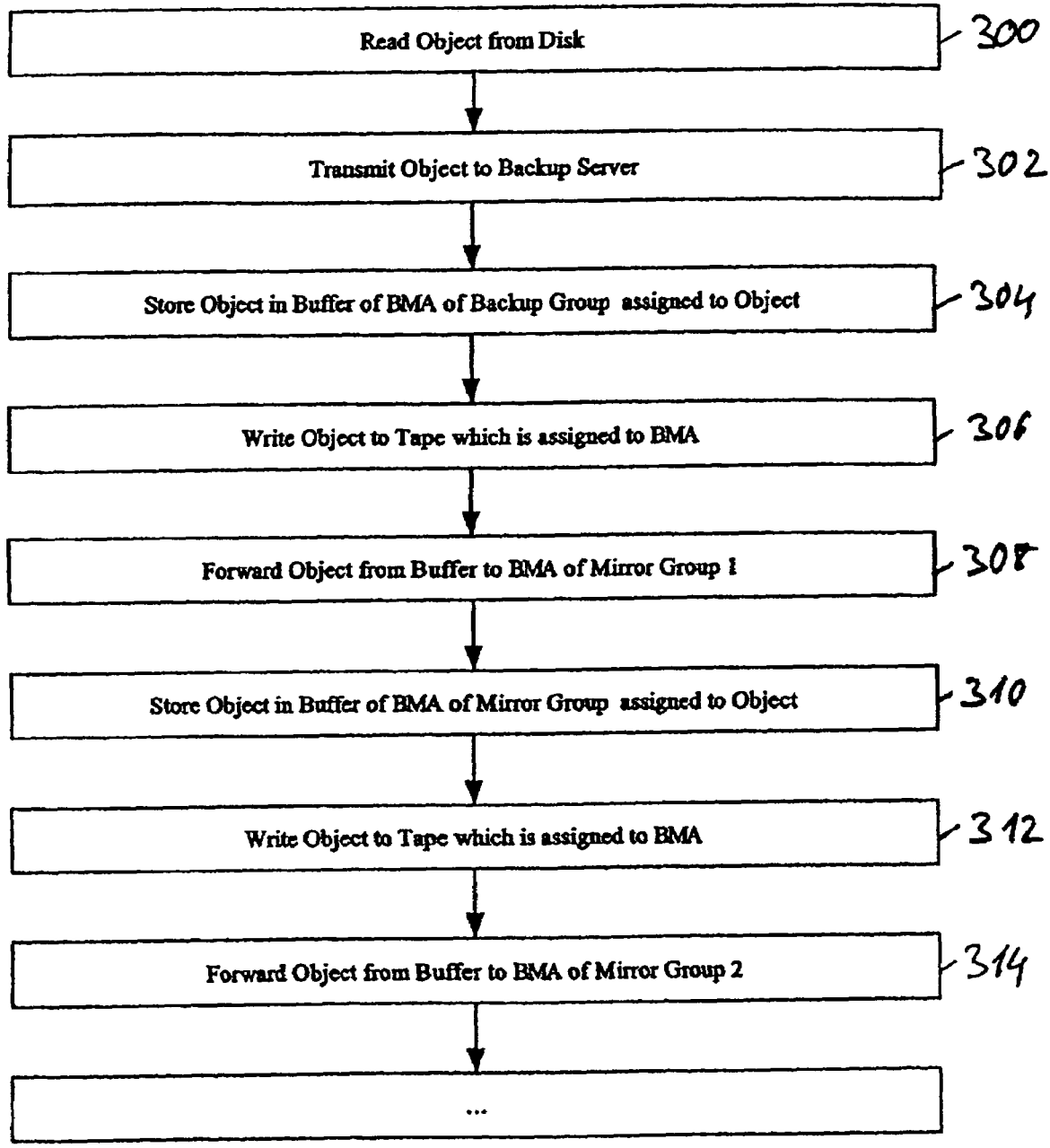
FIG. 3 is illustrative of a flow chart for performing a backup and data mirroring procedure.

FIG. 3 is a flow chart illustrating a backup and mirroring process. In step 300 a data object is read from a primary storage device, such as a disk, on one of the client computers by the data source backup agent and an unequivocal identifier is assigned to the data packets of the resulting data sequence. The data sequence of the data object is transmitted to the backup server in step 302.

In step 304 the data sequence of the data object is stored in a buffer of the backup media agent (BMA) which is assigned to the data object to be backed up. In step 306 the data stream of the object is written to a tape by means of a tape recorder being assigned to the backup media agent. The backup media agent may receive one or more additional data sequences from other data objects. If this is the case these individual data sequences of the data objects are combined into a single data sequence which is stored on the tape.

In step 308 the data sequence of the object is forwarded from the buffer memory to backup media agent of the first level of mirroring in step 308. In step 310 the data sequence is stored by the backup media agent on the first level of data mirroring on a tape by means of the tape recorder being assigned to that backup media agent. Again the backup media agent of the first data mirroring stage may receive other data sequences from other buffer memories of the backup group. In this case the individual data sequences are combined into a single data sequence which is written from the backup media agent of the mirror group 1 to its assigned tape recorder. This is done in step 312.

In step 314 the data sequence of the data object to be backed up is forwarded from the buffer of the backup media agent of mirror group 1 to a buffer of backup media agent of mirror group 2 for storage on a tape. This process can go on in order to provide multiple further mirroring stages.

Figure 4:
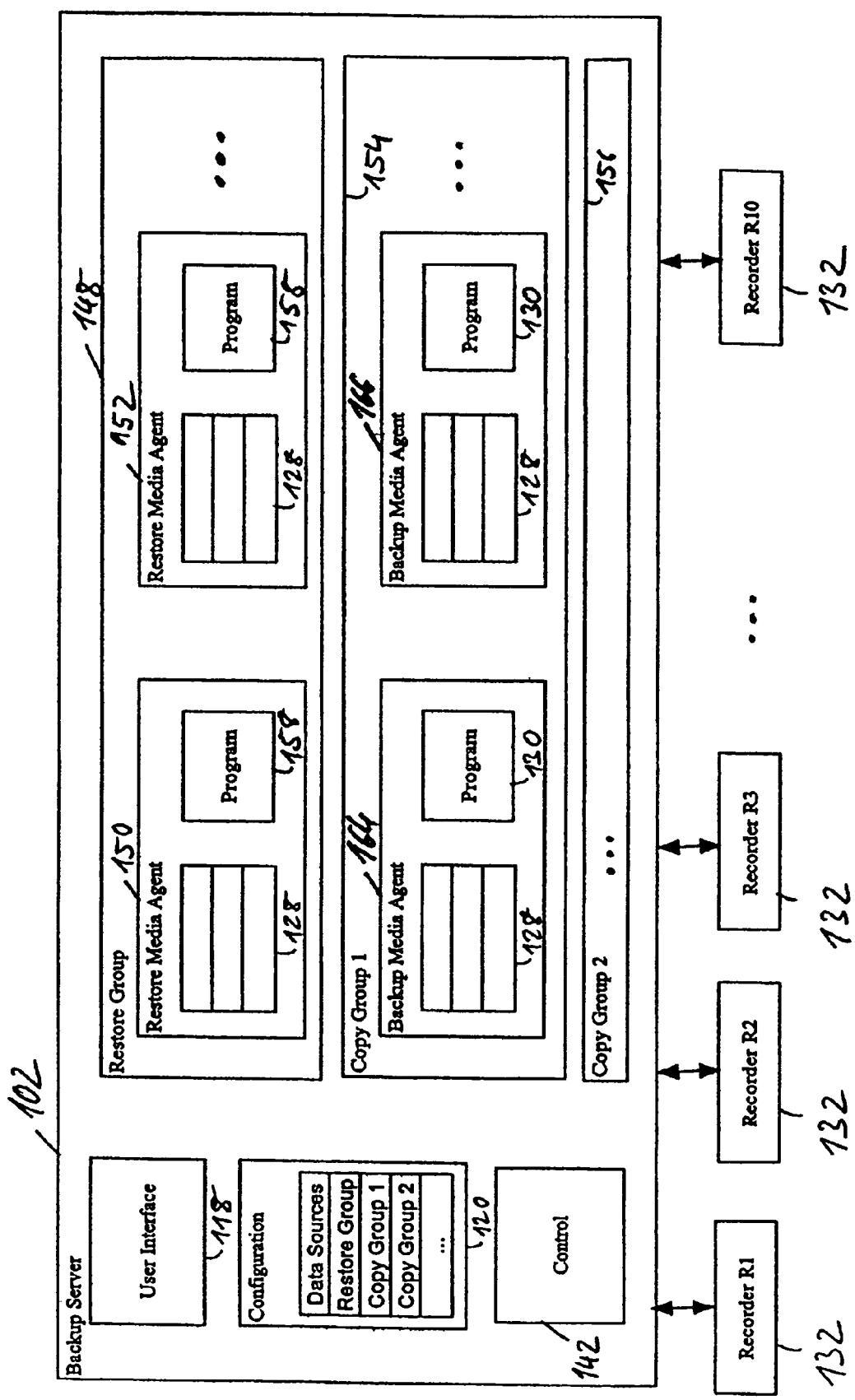
FIG. 4 is a block diagram of a backup server being configured to perform a copying procedure.

FIG. 4 shows backup server 102 in a copying configuration. The copying configuration is used for selectively copying backed up data from previously recorded backup tapes. For the purpose of copying the data needs to be read from the backup tapes which is done by means of restore media agents. Restore media agents have buffer memories and program module 158 of the tape backup software package. Usually restore media agents are activated for recovery of backup data, such as for the purpose of migration or disaster recovery. However in the preferred embodiment of FIG. 4 the restore media agents are used for the purpose of selective copying of previously backed-up data.

Backup server 102 has restore group 148 which comprises a number of restore media agents 150, 152, . . . . Further backup server 102 has copy groups 154, 156, . . . for providing one or more copying stages. In the example considered here two copying stages have been configured. Copy group 1 has backup media agent 164, 166, . . . .

The configuration of restore group 148 and copy groups 1 and 2 as well as the assignment of data sources to the restore media agents 150, 152 to data sources and recorders as well as the configuration of the copy groups and the assignment of the respective backup media agents 164, 160 to tape recorders 132 is stored in configuration file 120 and can be entered by means of program module 118 which provides the user interface.

Restore media agent 150 provides for an inversion of a backup operation performed by a backup media agent 164. For this purpose restore media agents 150, 152, . . . have program modules 158. For example program module 158 of restore media agent 150 reads a single data sequence from the recorder 132 which is assigned to restore media agent 150 and splits the single data sequence into data sequences of individual data objects. The individual data sequences are stored in buffer memories 128 from where they are forwarded to buffer memories 128 of copy group 1. From there the individual data sequences are forwarded to buffer memories of copy group 2 to provide two stages of copying.

Figure 5A:
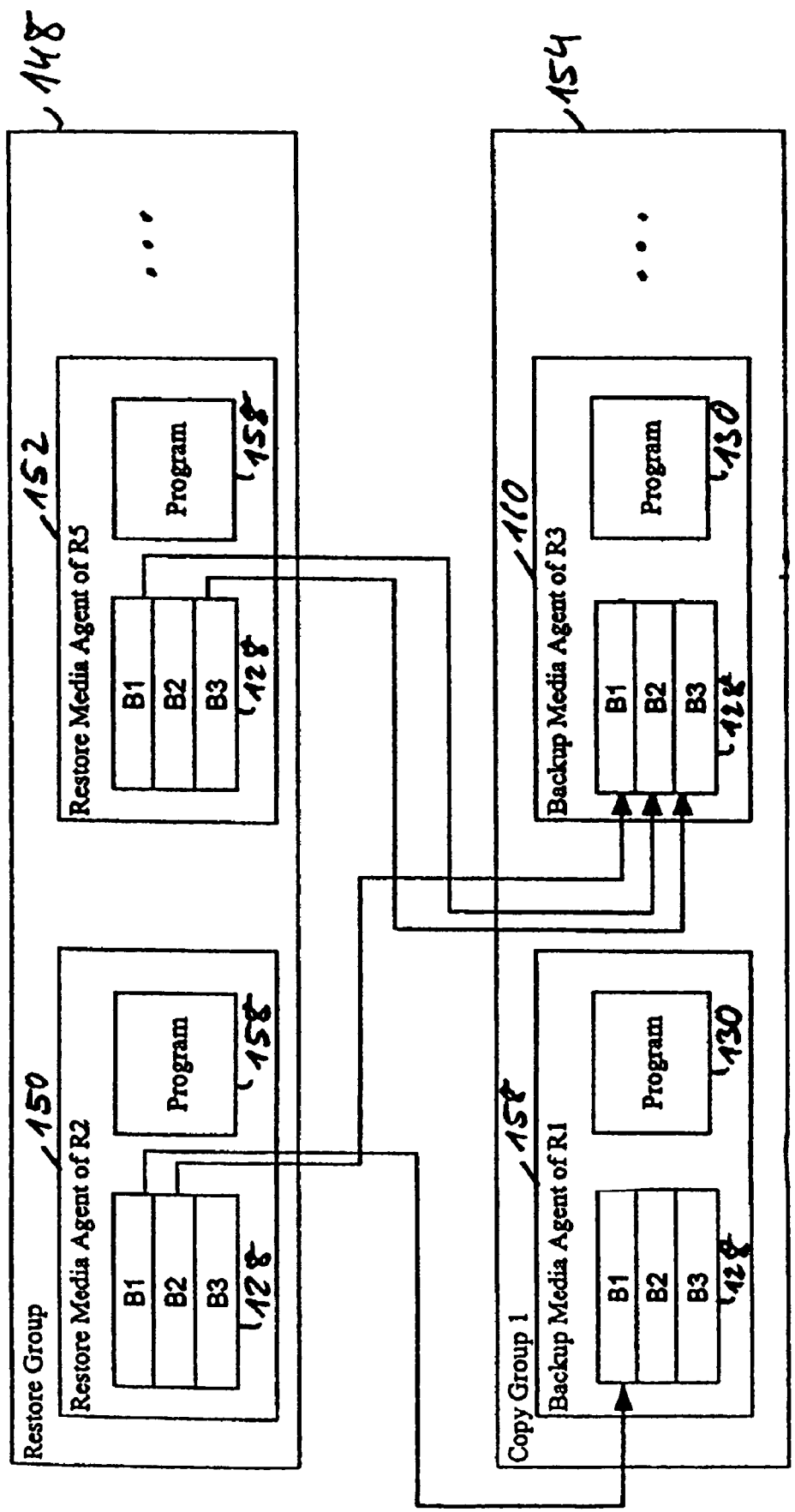
FIGS. 5A and 5B are illustrative of the coupling of buffers of restore media agents and backup media agents for the purposes of data copying.
Figure 5B:
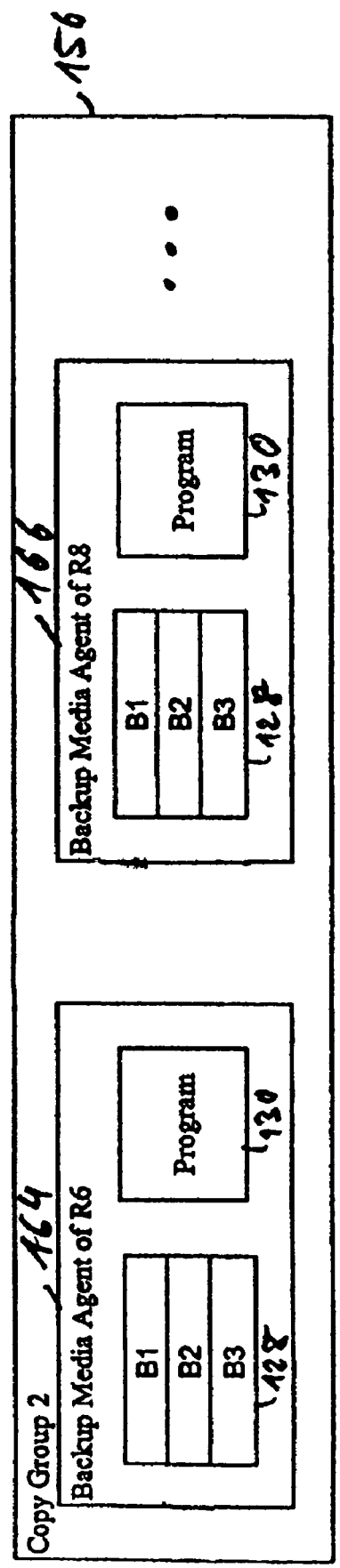

FIGS. 5A and 5B are more detailed diagrams of a configuration of the restore and copy groups by way of example.

Restore media agent 150 is coupled to tape recorder R2 whereas restore media agent 152 is coupled to tape recorder R5. Backup media agent 158 of copy group 1 is coupled to tape recorder R1 and backup media agent 160 is coupled to tape recorder R3. Backup media agent 164 of copy group 2 is coupled to tape recorder R6 and backup media agent 166 of copy group 2 is coupled to tape recorder R8.

Buffer memories B1 of restore media agent 150, B1 of backup media 158 and B2 of backup media agent 164 are connected in a daisy-chain. Further buffer memories B2 of restore media agent 150, B1 of backup media agent 160 and B3 of backup media agent 166 are connected in a daisy-chain configuration, etc.

In operation, programs 158 of restore media agents 150, 152, . . . read respective single data sequences from tape recorders R2 and R5. By means of the unequivocal identifiers assigned to the data packets of the single data sequences the single data sequences are split into individual data sequences of individual ones of the backed up data objects and stored in respective ones of the buffer memories 128. From there the individual data sequences are forwarded to buffers of copy group 1 and copy group 2 where respective copies are written on tape by means of the respective tape recorders assigned to the backup media agents of the copy groups.

The invention claimed is:

1. A backup system for storing data objects to be backed up on secondary storage devices, the backup system comprising a plurality of buffer memories for storing the data objects to be backed up and for coupling the data objects to be backed up with the secondary storage devices, the back up system being configurable to couple at least a sub-set of the buffer memories in a daisy-chain for sequential storage of the data in the daisy chain as the data objects to be backed up on one of the secondary storage devices, at least one backup media agent having a plurality of the buffer memories, a program module for sequentially writing data from the at least the subset of the buffer memories to an output adapted to be coupled to a secondary storage device assigned to the at least one backup media agent, and at least one mirroring backup media agent, the mirroring back up media agent comprising a plurality of further buffer memories and a further program module for writing data from the further buffer memories to one of the secondary storage devices assigned to the at least one mirroring backup media agent, and at least a sub-set of the buffer memories of the at least one backup media agent being coupled in a daisy-chain configuration to at least a sub-set of the further buffer memories of the at least one mirroring backup media agent.

2. The backup system of claim 1, further comprising a backup group having a plurality of the backup media agents.

3. The backup system of claim 1, further comprising at least one mirror group comprising a plurality of the mirroring backup media agents.

4. The system of claim 1, at least first and second ones of the mirroring backup media agents being coupled in a cascaded configuration for providing first and second mirroring levels.

5. The backup system of claim 1, further comprising at least one restore media agent comprising a plurality of buffer memories and a program module for reading data objects from one of the secondary storage devices assigned to the at least one restore media agent, at least a sub-set of the buffer memories of the at least one restore media agent being coupled to at least a sub-set of the buffer memories of the backup media agents.

6. The backup system of claim 5, further comprising at least one restore group having a plurality of the restore media agents.

7. The backup system of claim 5, further comprising a copy group, the copy group having a plurality of the backup media agents.

8. The backup system of claim 1, further comprising a plurality of client computer systems and a backup server, the plural client computer systems having primary storage devices for storing the data objects, and each client computer system having a backup component for assigning an unequivocal identifier to data objects and for sending the data objects with the assigned unequivocal identifiers to the backup server.

9. A server computer system comprising:
a plurality of buffer memories for sequentially coupling data stored in at least some of the buffer memories to one of plural backup storage devices,
and a configuration file for defining a configuration of the buffer memories for providing at least one level of data mirroring in the buffer memories, and for enabling the mirrored data stored in the buffer memories and data that are not mirrored and are stored in the buffer memories to be coupled to the backup storage device.

10. A server computer system comprising:
a plurality of buffer memories for coupling data stored in the buffer memories to a plurality of secondary storage devices,
a configuration file for defining a daisy-chain configuration of the buffer memories for sequential copying of data objects from a first sub-set of the secondary storage devices to a second sub-set of the secondary storage devices.

11. A memory storing a computer program for controlling a computer system for providing a user interface, the computer program comprising instructions for enabling a user to enter a specification for a configuration of buffer memories of a backup system, and for enabling the buffer memories to interface with secondary storage devices for sequential storing or copying of data objects from at least some of the buffer memories to one of the secondary storage devices.

12. The memory of claim 11, wherein the instructions enable a user to specify a daisy-chain configuration of the buffer memories.

13. The memory of claim 11, wherein the instructions enable a user to specify a backup group comprising a plurality of backup media agents, each backup media agent having a plurality of buffer memories and a program module for writing data from the buffer memories to one of a plurality of secondary storage devices assigned to the backup media agent.

14. The memory of claim 13, wherein the instructions enable a user to enter a mirror group comprising a plurality of buffer memories and the program module for writing of data from the buffer memories to one of the secondary storage devices being assigned to the mirroring media agent, and for specifying the coupling of a at least a sub-set of the buffer memories of the backup media agents and at least the sub-set of the buffer memories of the mirroring backup media agents.

15. The memory of claim 11, wherein the instructions enable a user to enter a restore group, the restore group comprising a plurality of backup media agents.

16. The memory of claim 15, wherein the computer instructions enable a user to enter at least one copy group, the copy group comprising backup media agents.

17. A method of storing data objects to be backed on secondary storage devices by using plural buffer memories at least a sub-set of which is coupled in a daisy chain configuration, the method comprising the step of:

sequentially storing the data objects to be backed up on one of the secondary storage devices by sequentially reading the data objects to be backed up from the buffer memories coupled in the daisy chain configuration to the one secondary storage device; and coupling the sub-set of the buffer memories in the daisy-chain configuration prior to the data objects being read from the buffer memories.

18. The method of claim 17, wherein the buffer memories are coupled to provide one or more data mirroring stages.

19. The method of claim 17, wherein the buffer memories are coupled to provide one or more data copying stages.

20. Apparatus for backing up memories of several client computers to plural secondary storage devices, each of the client computers including a data source backup agent, the apparatus comprising a backup group including plural backup media agents, different ones of said backup media agents being associated with different ones of the client computers, each of the backup media agents including plural buffers, each of said buffers being associated with a different one of the client computers and for storing data of the memory of the associated client computer, each of the backup media agents including a program module for (a) interacting with the data source backup agents of the client computers associated with the particular backup media agent to receive backup data from the client computers associated with the particular backup media agent, (b) routing the received backup data from the client computers to the buffers associated with the client computers, (c) sequentially combining the backup data in the buffers of the backup media agent including the particular program module into a single sequence and (d) coupling the single sequence to an output adapted to drive a secondary storage device associated with the particular backup media agent.

21. The apparatus of claim 20 further including a mirror group associated with each backup media agent, each mirror group including plural further buffers and a further program module, the plural further buffers and further program module of each mirror group being arranged in the same way as the backup media agent associated with the mirror group so the mirror group duplicates the action of its associated backup media agent for enabling the further program module to couple a further single sequence to a further secondary storage device associated with the particular mirror group.

22. The apparatus of claim 20 further including a mirror group associated with each backup media agent, each mirror group including plural further buffers and a further program module, the further program module and the plural further buffers being arranged for causing (a) objects stored in the buffers of the backup media agents to be forwarded to and stored in the plural further buffers of the mirror group associated with a particular backup media agent, (b) objects stored in the plural further buffers of the mirror group associated with the particular backup media agent to be sequentially combined into a further single sequence, and (c) the further single sequence to be coupled to an output adapted to drive a secondary storage device associated with the particular mirror group.

23. The apparatus of claim 20 in combination with the several client computers, at least one of the client computers including an arrangement for enabling a user to select files to be backed up in the buffer associated with the at least one client computer.

24. The apparatus of claim 20 in combination with the several client computers, each of the client computers including an identification generator for generating an unequivocal identifier for a given data packet in a particular data sequence, the apparatus of claim 20 including a configuration data storage device for specifying which data sources of the client computers are to be backed up and for defining the backup media agents.

* * * * *